(12) United States Patent
Nandakumar

(10) Patent No.: US 8,505,079 B2
(45) Date of Patent: Aug. 6, 2013

(54) AUTHENTICATION SYSTEM AND RELATED METHOD

(76) Inventor: Gopal Nandakumar, San Antonio, TX (US)

( * ) Notice: Subject to any disclaimer, the term of this patent is extended or adjusted under 35 U.S.C. 154(b) by 0 days.

(21) Appl. No.: 13/279,292

(22) Filed: Oct. 23, 2011

(65) Prior Publication Data

US 2013/0104201 A1 Apr. 25, 2013

(51) Int. Cl.
*G06F 7/04* (2006.01)
*G06F 15/16* (2006.01)
*G06F 17/30* (2006.01)
*H04L 29/06* (2006.01)

(52) U.S. Cl.
USPC .......................................................... 726/5

(58) Field of Classification Search
USPC .......................................................... 726/5
See application file for complete search history.

(56) References Cited

U.S. PATENT DOCUMENTS

| | | | |
|---|---|---|---|
| 7,437,145 B2 | 10/2008 | Hamada | |
| 7,552,467 B2 * | 6/2009 | Lindsay | 726/5 |
| 8,141,146 B2 | 3/2012 | Ozeki | |
| 2001/0047281 A1 | 11/2001 | Keresman, III et al. | |
| 2004/0255137 A1 * | 12/2004 | Ying | 713/193 |
| 2005/0273624 A1 | 12/2005 | Serpa | |
| 2006/0020783 A1 * | 1/2006 | Fisher | 713/156 |
| 2007/0192618 A1 | 8/2007 | Ellmore | |
| 2007/0204016 A1 | 8/2007 | Kunz et al. | |
| 2007/0250920 A1 * | 10/2007 | Lindsay | 726/7 |
| 2008/0034219 A1 * | 2/2008 | Ting | 713/186 |
| 2008/0066165 A1 | 3/2008 | Rosenoer | |
| 2008/0098464 A1 | 4/2008 | Mizrah | |
| 2008/0250477 A1 | 10/2008 | Samuelsson | |
| 2009/0063850 A1 | 3/2009 | Joram et al. | |
| 2009/0100270 A1 * | 4/2009 | Ting | 713/186 |
| 2009/0106825 A1 | 4/2009 | Cerruti | |
| 2009/0259588 A1 * | 10/2009 | Lindsay | 705/40 |
| 2010/0217975 A1 | 8/2010 | Grajek | |
| 2010/0241595 A1 | 9/2010 | Felsher | |
| 2011/0041165 A1 | 2/2011 | Bowen | |
| 2011/0321125 A1 | 12/2011 | Kyohgoku | |
| 2012/0144461 A1 | 6/2012 | Rathbun | |
| 2012/0144468 A1 | 6/2012 | Pratt | |
| 2012/0151567 A1 | 6/2012 | Chayanam | |
| 2012/0239928 A1 | 9/2012 | Judell | |

OTHER PUBLICATIONS

U.S. Appl. No. 13/279,287, filed Oct. 23, 2011, by Gopal Nandakumar (maintained in IFW system).
U.S. Appl. No. 13/279,288, filed Oct. 23, 2011, by Gopal Nandakumar (maintained in IFW system).
U.S. Appl. No. 13/279,289, filed Oct. 23, 2011, by Gopal Nandakumar (maintained in IFW system).
U.S. Appl. No. 13/279,290, filed Oct. 23, 2011, by Gopal Nandakumar (maintained in IFW system).
U.S. Appl. No. 13/279,293, filed Oct. 23, 2011, by Gopal Nandakumar (maintained in IFW system).
U.S. Appl. No. 13/279,294, filed Oct. 23, 2011, by Gopal Nandakumar (maintained in IFW system).
U.S. Appl. No. 13/279,295, filed Oct. 23, 2011, by Gopal Nandakumar (maintained in IFW system).
U.S. Appl. No. 13/279,296, filed Oct. 23, 2011, by Gopal Nandakumar (maintained in IFW system).
U.S. Appl. No. 13/279,297, filed Oct. 23, 2011, by Gopal Nandakumar (maintained in IFW system).

* cited by examiner

*Primary Examiner* — Kambiz Zand
*Assistant Examiner* — Stephen Sanders

(57) ABSTRACT

A system and method whereby the identity of a person, entity, device or the like attempting to gain access to a secured resource may be securely authenticated includes a means for receiving from a requester purporting to be an authorized user of a secured resource a request for access by an unauthorized user (such as, for example, a retail store, a service station, an on-line service provider or merchandiser, a healthcare provider, a medical insurer, an information consumer or the like) to the secured resource; a means for determining a key string adapted to provide a basis for authenticating the identity of the requester; a means for receiving an authentication credential associated with the request for access; and a means for evaluating the authentication credential to authenticate the identity of the requester.

20 Claims, 14 Drawing Sheets

AUTHENTICATION SYSTEM AND RELATED METHOD

FIELD OF THE INVENTION

The present invention relates to security protocols for use in securing and/or restricting access to personal other confidential information, physical locations and the like. More particularly, the invention relates to a system and related method whereby the identity of a person, entity, device or the like attempting to gain access to a secured resource may be securely authenticated.

BACKGROUND OF THE INVENTION

The protection of personal information and/or other secured resources, such as, for example, credit data, medical history, financial account information, secured physical locations and the like is of ever increasing concern to businesses and individuals alike. To be sure, each passing day reveals more sophisticated attacks by those who would gain unauthorized access to such resources absent the constant vigilance of those charged with the protection of such resources. To this end, the various security protocols employed for the protection of such resources almost universally includes some means for authenticating the identity of a person, entity, device or the like attempting to gain access to a secured resource.

More often than not the critical authentication is carried out by the age old process of a providing a privately held password, personal identification number or the like in connection with some generally publicly known identifier for the person, entity, device or the like attempting to gain access to the secured resource. Unfortunately, however, this protocol is dogged by vulnerability to interception through spoofing, eavesdropping, and countless other techniques though which a password, personal identification number or the like may become known to an attacker. Additionally, it is common to find that a single person, entity, device or the like uses the same password, personal identification number or the like in connection with gaining access to multiple secured resources. In such case, a security breach in connection with a single secured resource may jeopardize the security of all other secured resources.

Giving the fundamentally flawed state of the art with respect to password type protection, it is therefore the overriding object of the present invention to improve over the prior art by providing a system and related method by which authentication may be more securely conducted. Additionally, it is an object of the present invention to provide such a system and related method that is robust in specific implementation and readily usable by any manner of person, entity, device or the like. Finally, it is an object of the present invention to provide such a system and method that is economical in implementation and therefore readily accessible to virtually any application.

SUMMARY OF THE INVENTION

In accordance with the foregoing objects, the present invention—an authentication system for authenticating the identity of a requester of access by or for an unauthorized user to a secured resource—generally comprises a means for receiving from a requester purporting to be an authorized user of a secured resource a request for access by an unauthorized user (such as, for example, a retail store, a service station, an on-line service provider or merchandiser, a healthcare provider, a medical insurer, an information consumer or the like) to the secured resource; a means for determining a key string adapted to provide a basis for authenticating the identity of the requester; a means for receiving an authentication credential associated with the request for access; and a means for evaluating the authentication credential to authenticate the identity of the requester.

In at least some implementations of the present invention, the authentication system further comprises a means for generating and communicating to the purported authorized user a confirmation message indicating receipt of the request for access.

In at least some implementations of the present invention, the authentication system further comprises a means for determining from among a plurality of secured resources associated with the authorized user the identity of a single secured resource for which the requester desires access.

In at least some implementations of the present invention, the authentication system further comprises a means for conducting for the benefit of the unauthorized user a transaction reliant upon access to the secured resource for which the requester desires access.

In at least some implementations of the present invention, the authentication system further comprises a means for determining whether the authentication credential should, as a result of passage of time and regardless of content, be deemed to be invalid.

Additionally, a method for authenticating the identity of a requester of access to a secured resource generally comprises the steps of receiving from a requester purporting to be an authorized user of a secured resource a request for access by an unauthorized user (such as, for example, a retail store, a service station, an on-line service provider or merchandiser, a healthcare provider, a medical insurer, an information consumer or the like) to the secured resource; determining a key string adapted to provide a basis for authenticating the identity of the requester; receiving an authentication credential associated with the request for access; and evaluating the authentication credential to authenticate the identity of the requester.

In at least some implementations of the present invention, the authentication system further comprises the steps of generating and communicating to the purported authorized user a confirmation message indicating receipt of the request for access.

In at least some implementations of the present invention, the authentication method further comprises the step of determining from among a plurality of secured resources associated with the authorized user the identity of a single secured resource for which the requester desires access.

In at least some implementations of the present invention, the authentication method further comprises the step of conducting for the benefit of the unauthorized user a transaction reliant upon access to the secured resource for which the requester desires access.

In at least some implementations of the present invention, the authentication method further comprises the step of determining whether the authentication credential should, as a result of passage of time and regardless of content, be deemed to be invalid.

Finally, many other features, objects and advantages of the present invention will be apparent to those of ordinary skill in the relevant arts, especially in light of the foregoing discussions and the following drawings, exemplary detailed description and appended claims.

BRIEF DESCRIPTION OF THE DRAWINGS

Although the scope of the present invention is much broader than any particular embodiment, a detailed description of the preferred embodiment follows together with illustrative figures, wherein like reference numerals refer to like components, and wherein.

DETAILED DESCRIPTION OF THE PREFERRED EMBODIMENT

Although those of ordinary skill in the art will readily recognize many alternative embodiments, especially in light of the illustrations provided herein, this detailed description is exemplary of the preferred embodiment of the present invention, the scope of which is limited only by the claims appended hereto.

Figure 1:
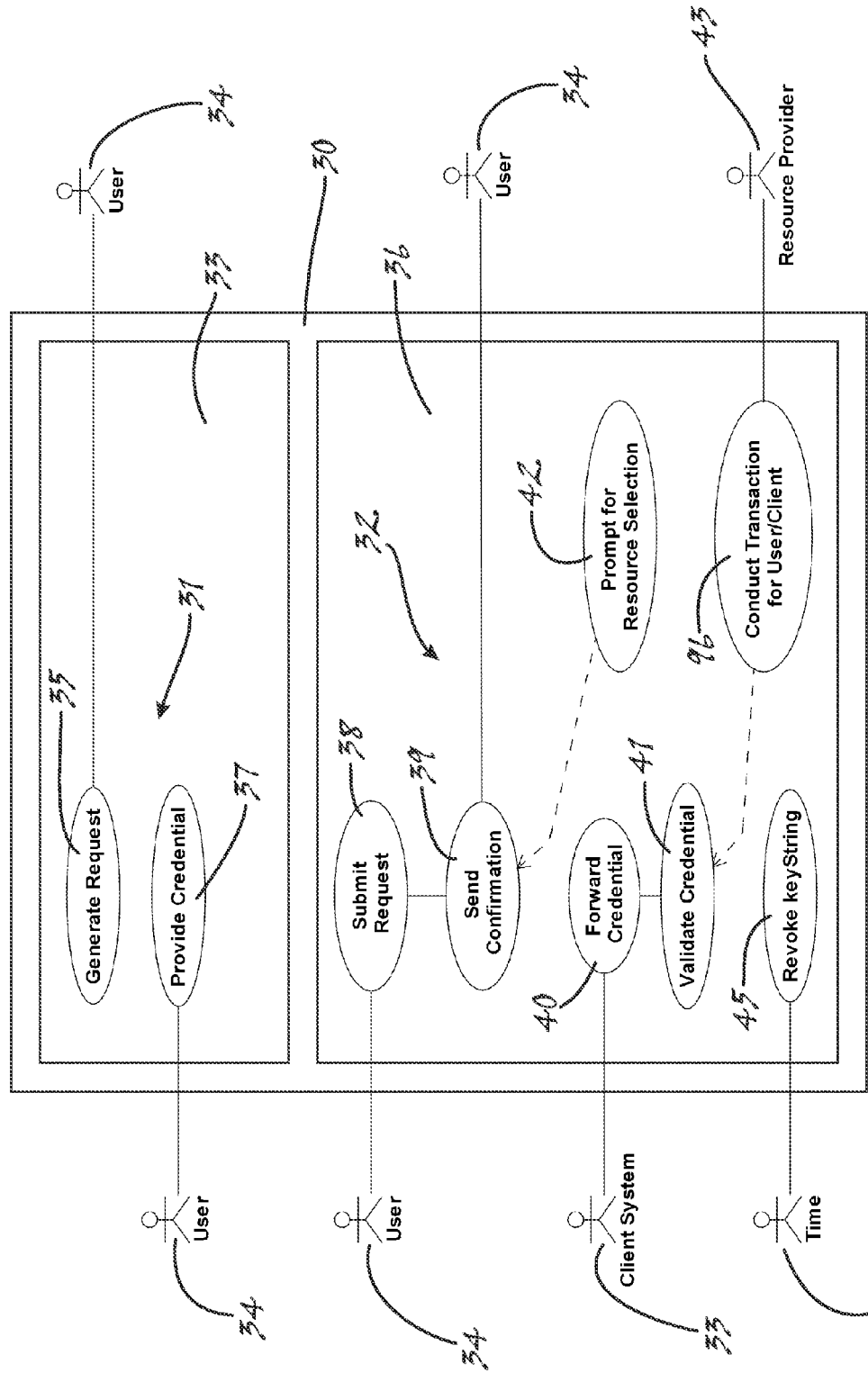
FIG. 1 shows, in an overview use case diagram, the various basic functionality implemented in the preferred embodiment of the authentication system and method of the present invention.

Referring now to the figures, and to FIG. 1 in particular, the authentication system 30 of the present invention is shown to generally comprise an operative combination of a plurality of service client implemented use cases 31 and a plurality of service provider implemented use cases 32. In particular, the service client 33 of the present invention will generally provide for an end user actor 34 a means 35 for identifying the service client 33 to a service provider 36 for the purpose of requesting that the service provider 36 provide for the service client 33 access to a secured resource. Additionally, the service client 33 of the present invention will generally provide for an end user actor 34 a means 37 for submitting an authentication credential to the service client 33 for use by the service client 33 in obtaining from the service provider 36 access to the requested secured resource.

As also particularly shown in FIG. 1, the service provider 36 of the present invention will generally provide for an end user actor 34 a means 38 for requesting that access to a secured resource be provided by the service provider 36 for a service client 33. Additionally, the service provider 36 of the present invention will generally provide responsive to the submission by an end user actor 34 of a request for access to a secured resource a means 39 for generating and sending to the end user actor 34 a confirmation message 94 indicating that a submitted request was received by the service provider 36. Further, the service provider 36 of the present invention will generally provide for a service client actor 33 a means 40 for forwarding an end user provided authentication credential to the service provider 36. Still further, the service provider 36 of the present invention will generally provide responsive to the forwarding by a service client actor 33 of an authentication credential a means 41 for validating the authentication credential.

In an extension of the present invention particularly useful in implementations wherein the service provider 36 may not otherwise be readily able to determine the identity of a resource to which an end user actor 34 requests access based on the information content of the request as initially submitted by the end user actor 34 to the service provider 36, the service provider 36 may in combination with the means 38 for requesting access to a secured resource also be adapted to provide a means for determining a particular resource for access on the authority of the end user actor 34 such as, for example, a means 42 for prompting the end user actor 34 to provide additional identifying information for the requested resource.

In a further extension of the present invention particularly useful in the most typical implementations of the present invention wherein for security or other reasons the service client 33 is unable to directly access features or functionality of a resource for which an end user actor 34 has requested access, the service provider 36 is also adapted to provide for the end user actor 34 and/or the service client actor 33 a means 96 for conducting a transaction reliant upon or otherwise in connection with the requested secured resource. In this case, it is noted that the secured resource may be provided by and/or otherwise under the further control of a resource provider actor 43 external to the service provider 36 or, in the alternative, may be provided and/or implemented by and/or otherwise under the control of the service provider 36. In any event, the means 96 for conducting a transaction reliant upon or otherwise in connection with the requested secured resource may generally also further comprise a means for reporting the conducted transaction to the service client actor 33 and/or the end user actor 34.

Finally, it is noted that time 44 as an actor may be accommodated as desired in any particular implementation wherein the service provider 36 is also provided with a means 45 responsive to the passage of time for revoking or otherwise invalidating an authentication credential such that an authentication credential otherwise correctly provided by an end user actor 34 to a service client actor 33 and forwarded to the service provider 36 may as a result of the passage of time be deemed to be incorrect, thereby resulting in a validation failure upon application of the means 41 for validating the authentication credential.

Figure 2:
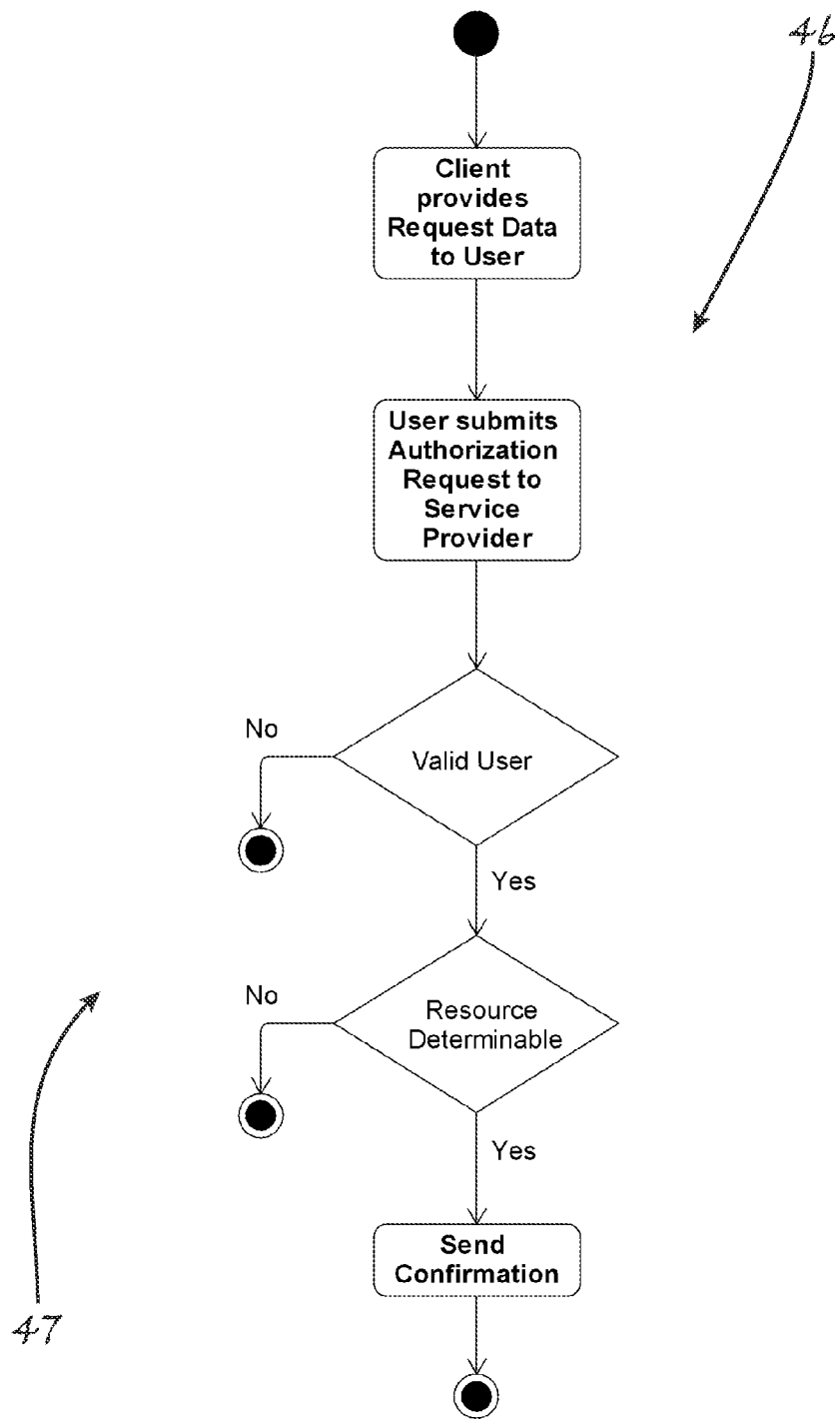
FIG. 2 shows, in a flowchart, an overview of the various steps generally taken in making a request for access to a secured resource in accordance with the present invention.
Figure 3:
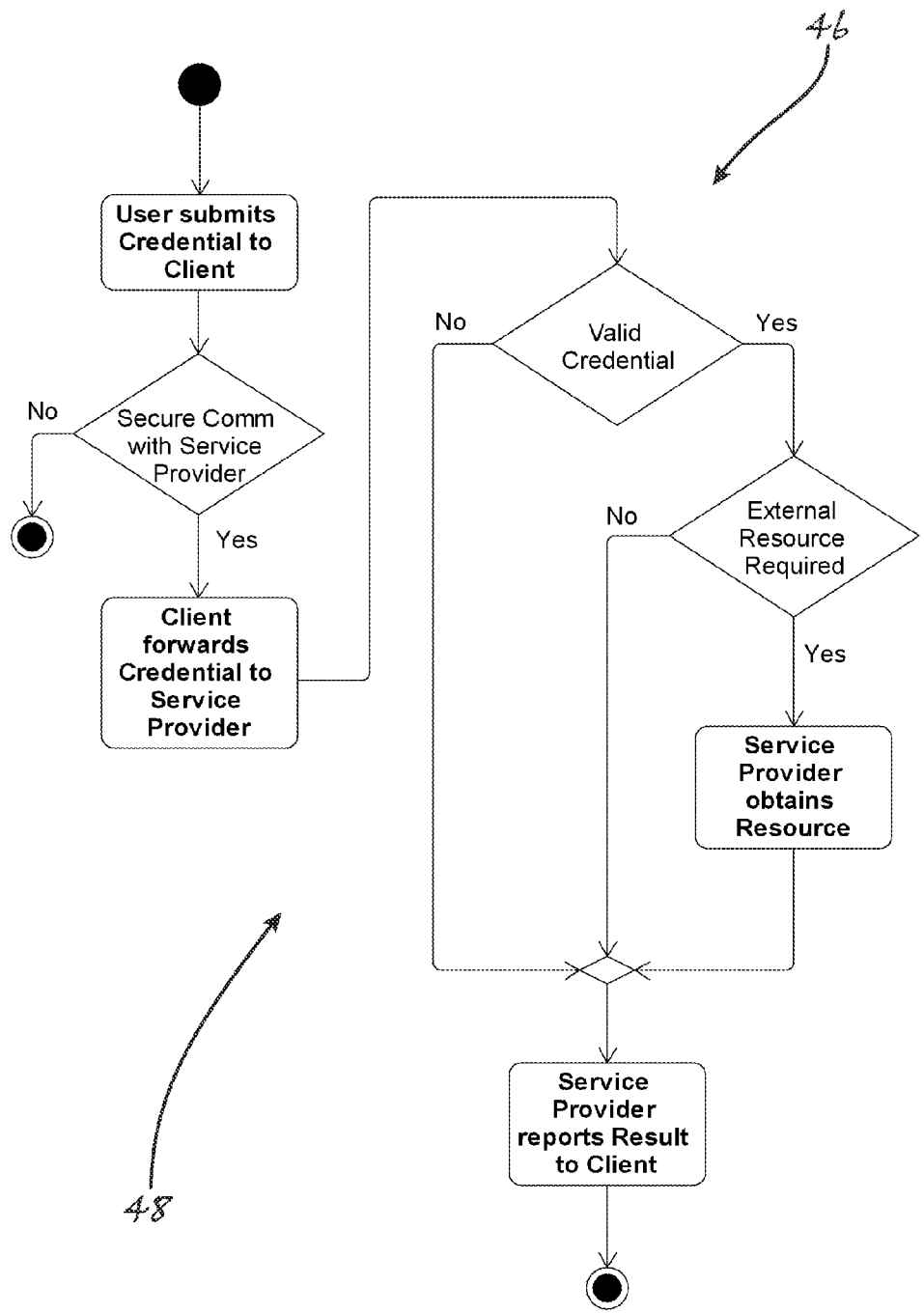
FIG. 3 shows, in a flowchart, an overview of the various steps generally taken in validating the purported access right of a user requesting access to a secured resource in accordance with the present invention.
Figure 4:
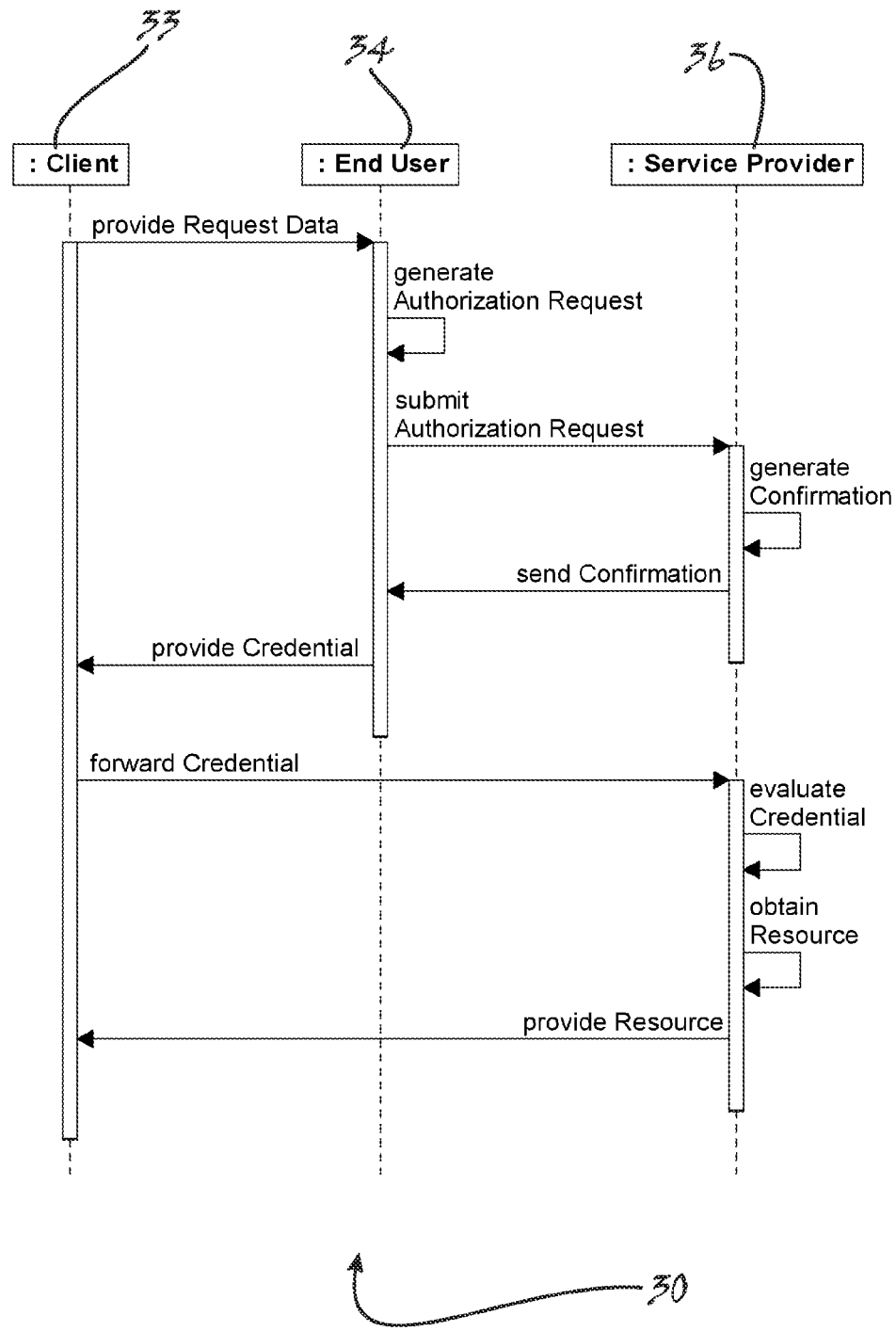
FIG. 4 shows, in an overview sequence diagram, various interactions as generally take place during the operation of the authentication system and method of the present invention.

Referring now then to FIGS. 2 through 4 in particular, the authentication method 46 of the present invention as operative upon the described authentication system 30 is shown to generally comprise various series of interactions between a user 34, a service client system 33 and a service provider system 36, as broadly set out in FIG. 4, wherein the interactions may be broadly categorized as steps 47 implicated in requesting access to a secured resource, as broadly set out in FIG. 2, and steps 48 implicated in validating the purported access right of the user requesting access to the secured resource, as broadly set out in FIG. 3.

As particularly shown in FIGS. 2 and 4, the authentication method 46 of the present invention generally begins with an end user 34 obtaining from a service client 33 data or other information necessary for the end user 34 to request that a service provider 36 provide for the service client 33 access to a secured resource. This data or other information will generally comprise the identification of the service client 33, but may additionally comprise any other data or information as may be helpful for the conduct of a particular transaction such as, for example, a purchase amount 76, a client reference, detailed or itemized transaction data or the like. In any case, the service client provided information is then utilized by the end user 34 to submit a request message 84 to the service provider 36 for the service provider 36 to provide for the service client 33 access to a secured resource.

Once a submitted request message 84 is received by the service provider 36, the service provider 36 preferably determines whether the end user 34 making the request is authorized or otherwise permitted to make such use of the authentication system 30. If in an implementation of this feature it is determined that the end user 34 is not authorized or otherwise permitted to make the attempted use of the authentication system 30 the process 47 will generally terminate whereas if it is determined that the end user 34 is authorized or otherwise permitted to make the attempted use of the authentication system 30 the process 47 will generally continue. Continuing in an important step, the service provider 36 must be able to evaluate the request message 84 to determine the specific identity of the resource for which the request is made. Because, in at least some implementations of the present invention, the common identifier for the resource will for security reasons not be allowed to be openly transmitted as part of submitted request, this step will in such implementations involve determining the identity of the resource from some element or combination of elements of information other than the common identifier for the resource. In any case, if the available and/or obtainable information is insufficient for the service provider 36 to positively determine the identity of the resource for which the end user 34 has requested access the process 47 will generally terminate whereas if the available and/or obtainable information is sufficient for the service provider 36 to positively determine the identity of the resource for which the end user 34 has requested access the process 47 will generally continue.

In the final steps for processing a request for access to a secured resource, the service provider 36 preferably generates a confirmation message 94 for use by the end user 34 for indicating to the end user 34 that a submitted request message 84 has in good order been received by the service provider 36 and, thereafter, sends the confirmation message 94 to the end user 34. With the confirmation message 94 issued by the service provider 36 to the end user 34, the end user 34 will then submit a previously established authentication credential to the service client 33.

Referring then to FIGS. 3 and 4 in particular, validation 48 of the purported access right of the user requesting access to a secured resource is shown to generally begin with the submission to a service client 33 by the end user 34 of an authentication credential, which authentication credential simply comprises a previously established key string known to both the service provider 36 and the end user 34. Once submitted by an end user 34 to a service client 33, however, an authentication credential must in order for the validation 48 to continue be forwarded by the service client 33 to the service provider 36. To this end, in an optional but most preferred feature of the present invention, the service client 33 may be programmed or otherwise configured to ensure prior to forwarding the authentication credential to the service provider 36 that a secure communication channel is first established between the service client 33 and the service provider 36. If in an implementation of this feature the required secure communication channel cannot be established between the service client 33 and the service provider 36 the continuing process 48 will generally terminate whereas if the required secure communication channel is successfully established between the service client 33 and the service provider 36 the process 48 will generally continue.

Upon successful forwarding by the service client 33 to the service provider 36 of the end user submitted authentication credential, the service provider 36 proceeds to validate the responsive authentication credential by comparing the credential against a known correct key string. As will be appreciated by those of ordinary skill in the art in light of this exemplary description, the known correct key string will simply be the same key string known to both the service provider 36 and the end user 34 and used by end user 34 as an authentication credential in connection with the transaction in progress. In addition to comparison of the authentication credential to a known correct key string, however, it is noted that in an authentication system utilizing time 44 as an actor in order to provide a timeout for the validity of an authentication credential provided in connection with a particular requested transaction the service provider 36 will be programmed or otherwise adapted to determine as part of the validation step whether as a result of the passage of time 44 the authentication credential should for the particular transaction in progress be deemed to be incorrect. In any case, if the authentication credential is found or otherwise deemed to be incorrect, the service provider 36 will preferably report the incorrect finding to the service client 33 and/or the end user 34 and the process 48 will generally terminate whereas if the authentication credential is found to be correct the process 48 will generally continue.

With the authentication credential found to be correct, the service provider 36 may simply report the correct finding to the service client 33 or, if for security or other reasons the service client 33 is unable to directly access features or functionality of a resource for which an end user actor 34 has requested access, the service provider 36 will then obtain for the end user 34 and/or the service client 33 the benefit of the requested secured resource and thereafter appropriately report the conducted transaction to the service client 33 and/or the end user 34.

With the foregoing broad overview of the general structure and function of the authentication system 30 of the present invention in mind, it is now noted that in accordance with the present invention an end user 34 may comprise any person or machine requiring, in connection with some other use, access or other relationship with a service client 33, access for the service client 33 to a secured resource for which the service client 33 is restricted from full knowledge and for which the service provider 36 may hold full knowledge, full knowledge being defined herein as knowledge sufficient to make ordinary full use of the secured resource outside of the framework of the authentication system 30 and method 46 of the present invention. By way of simple example, the resource may comprise password protected information (e.g., a credit report) a portion of which (e.g., only the credit scores) a human end user 34 wishes to share with a service client 33 comprising an information consumer (e.g., a potential creditor) without providing to the information consumer the password (e.g., by which the full credit report is protected and as would otherwise enable the potential creditor to gain full access to the protected credit file). Under the present invention, a service provider 36 having associated therewith a hardware and/or software implementation of the previously generally discussed functionality is in accordance with the present invention programmed or otherwise adapted to receive directly from the service client 33 an end user provided authentication credential associated with the service client 33 as a result of a request by the end user 34 for the service provider 36 to provide for the service client 33 access to a secured resource and, thereafter, to validate the authentication credential from the service client 33 to ensure that the request is made under the authorization of an end user 34 having right of access to the secured resource.

With this in mind, the end user 34 may, for example and without limitation, be a patient wishing to share medical information (a secured resource) with a healthcare or medical insurance provider (a service client 33) without having to grant to the healthcare or medical insurance provider unfettered access to all of his or her medical records; the end user 34 may be the holder of a credit card account, banking account, automated teller machine ("ATM") card and/or account or the like (a secured resource) wishing to purchase merchandise, services, information or the like from a retail store, service station, on-line service provider or merchandiser, other business or the like (a service client 33) without providing the service client 33 with his or her full credit card information, e.g. without providing his or her Card Verification ("CV") code, banking account information, personal identification number ("PIN") associated with the ATM card or the like; or a credit applicant or other holder of an information product wishing to share a credit score or other information (a secured resource) with a consumer of information products, such as an automobile dealership in need of consumer credit data or the like (a service client 33) without providing his or her Social Security Number or other information not necessary to the conduct of the present transaction.

In a critical aspect of the authentication system 30 and method 46 of the present invention, an additional security measure is implemented by requiring that the service client 33 be restricted from access to the common identifier for the secured resource, e.g. the account number for a credit card or financial deposit account; the Social Security Number of a patient; the account number of an ATM card; or the like. In order to better describe these critical aspects of the present invention, however, reference is now made to the deployment diagram of FIG. 5, wherein there is shown the various elements of an exemplary hardware and software based implementation of an authentication system 30 constructed in accordance with the teachings of the present invention.

Figure 5:
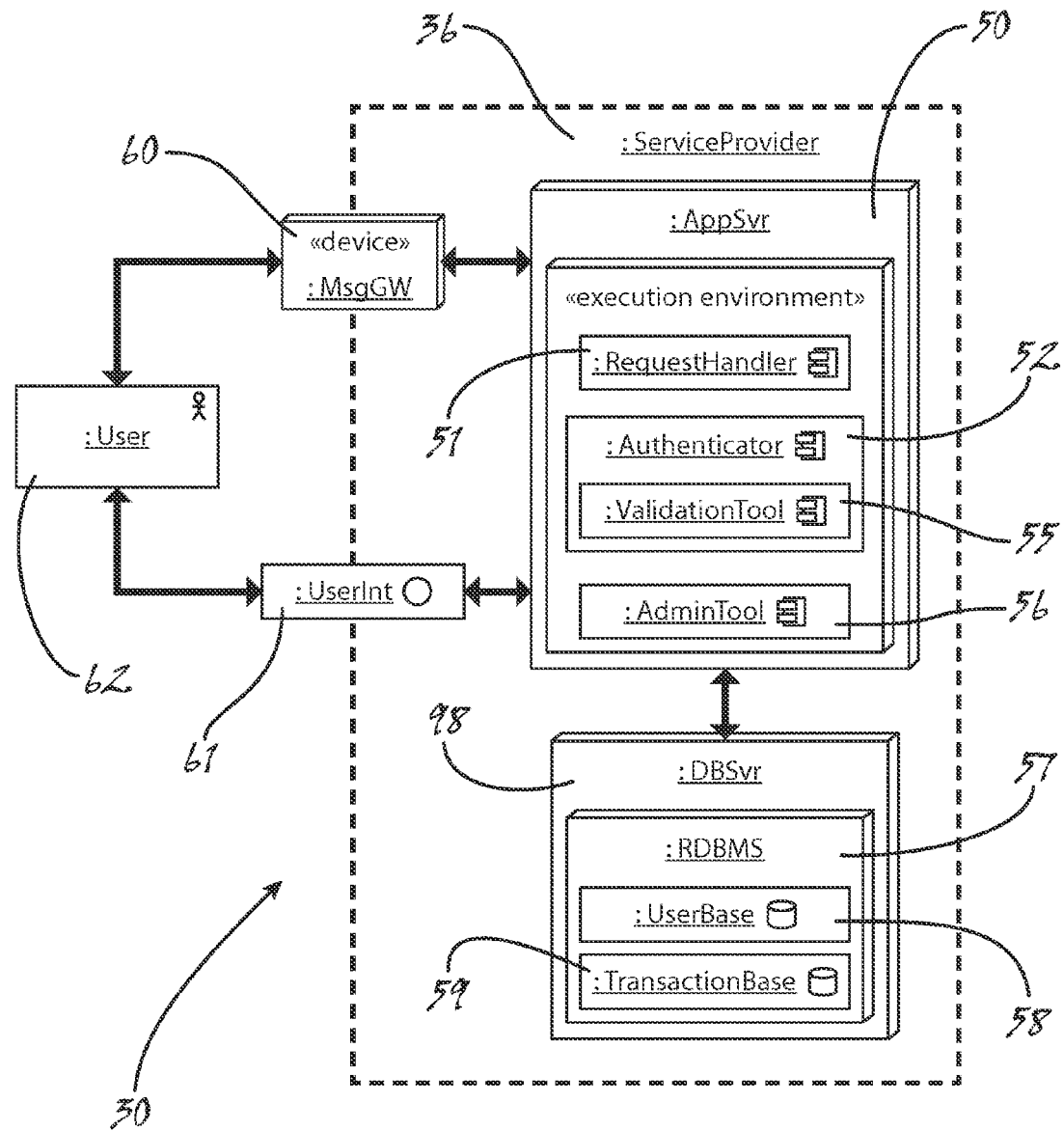
FIG. 5 shows, in a deployment diagram, an exemplary hardware and software implementation of the authentication system and method of the present invention.

Before continuing, however, it is noted that while the implementation depicted in FIG. 5 is exemplary of the authentication system 30 of the present invention, it is in no manner meant to be all encompassing or otherwise limiting of the wide range of implementations as are possible. In addition, it is noted that while some elements are in FIG. 5 shown to comprise hardware and others software, virtually any element could be implemented in either hardware or software or any combination thereof. Still further, it is noted that while for clarity of discussion various hardware elements are segregated between different machines and various software elements are segregated into various components, no such segregation should be deemed as required unless specifically stated herein and further or differing division into various particular components, modules, classes, objects or the like should be taken as within the scope of the present invention as limited only by the claims appended hereto. Finally, to the extent that any structural (including software) element is stated as being adapted to perform some function, such language is to be taken as a positive structural limitation imposed upon the referenced element whereby the element is required to be actually adapted, programmed, configured or otherwise provided with the actual capability for performing the specified function. In no case shall such language be taken as merely a statement of intended use or the like, but to the contrary such language shall be in every case taken to read on all structures of the referenced element that are in any manner actually in the present tense configured to perform the specified function (as opposed to being merely capable of adaption for the conduct of the specified function).

Turning then to FIG. 5, a service provider 36 (such as, for example, may comprise a specialized provider of the authentication services of the present invention; a provider of other products or services having need of authentication services, such as, for example, a credit card processor or financial institution or an alarm monitoring company; or the like) is shown for purposes of this exemplary discussion to have associated therewith one or more application servers 50 or database servers 98 upon which may be hosted software functionality necessary to operation within the framework of the present invention. In particular, an application server 50 may host a request handler software component 51 adapted to receive, process and/or otherwise handle request messages 84 from end users 34 and submissions from end users 34 or service clients 33 as well as to produce output for end users 34 and/or service clients 33 as may be necessary in the operation of the present invention. Additionally, the application server 50 may host an authenticator 52 adapted to handle or otherwise control all aspects of the authentication process within the realm of responsibility of the service provider 36, including receiving authentication requests, storing and/or retrieving data pertinent to the processing of such requests, directing the generation and sending of confirmation messages 94, and directing the validation of credentials submitted for authentication and actions taken based upon the results of such validations. In order to improve efficiency, the authenticator component 52 may comprise one or more further specialized components such as, for example, a validation tool 55 adapted to conduct the specialized task of comparing received credentials with known key strings. Still further, the application server 50 may also host an administration tool 56 through which various aspects of the setup, maintenance and operation of the hardware and software systems of the service provider 36 may be managed.

Figure 7:
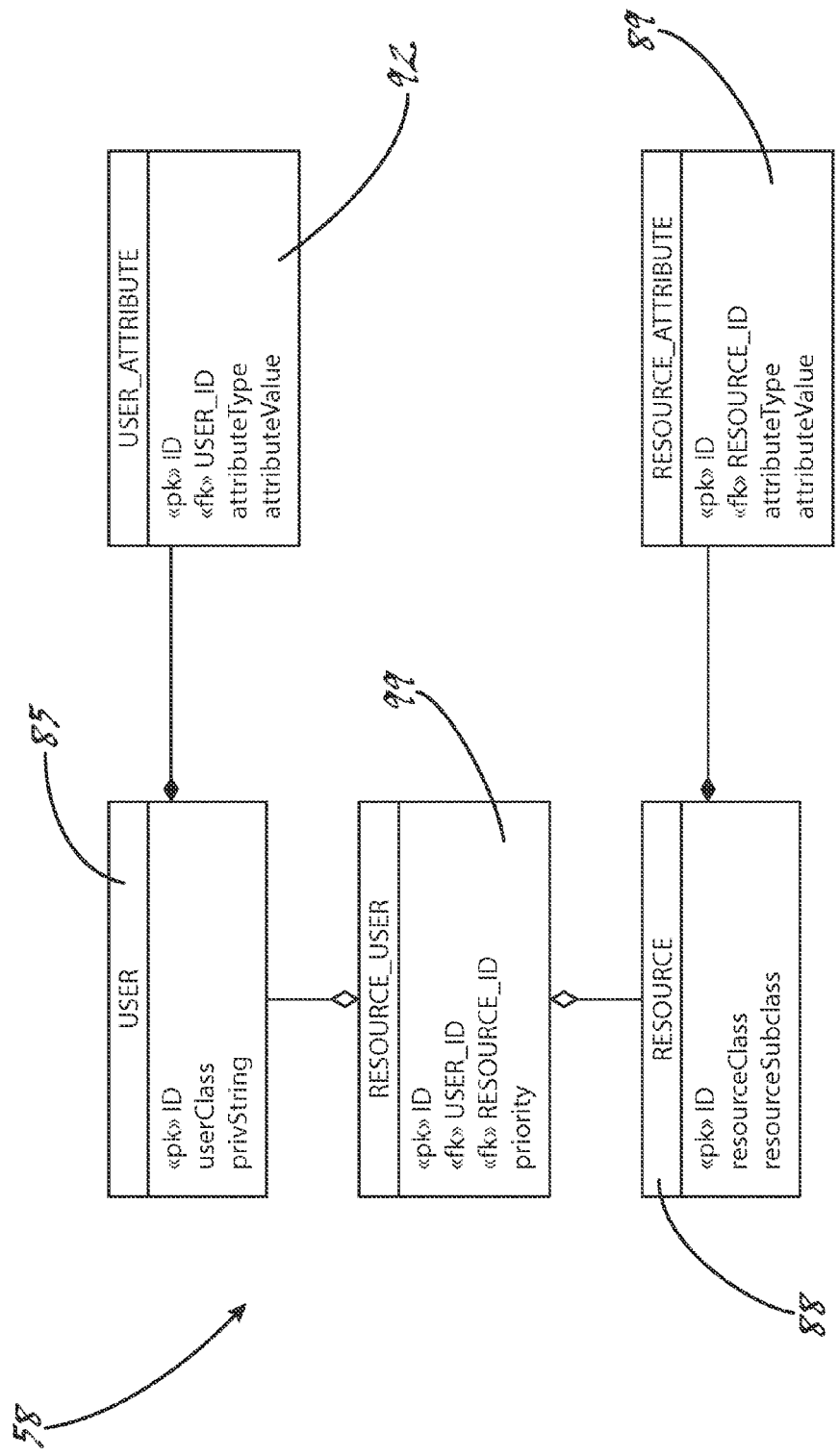
FIG. 7 shows, in a class diagram, a high level schema for a representative user database as may be implemented in connection with the exemplary hardware and software implementation of FIG. 5.
Figure 8:
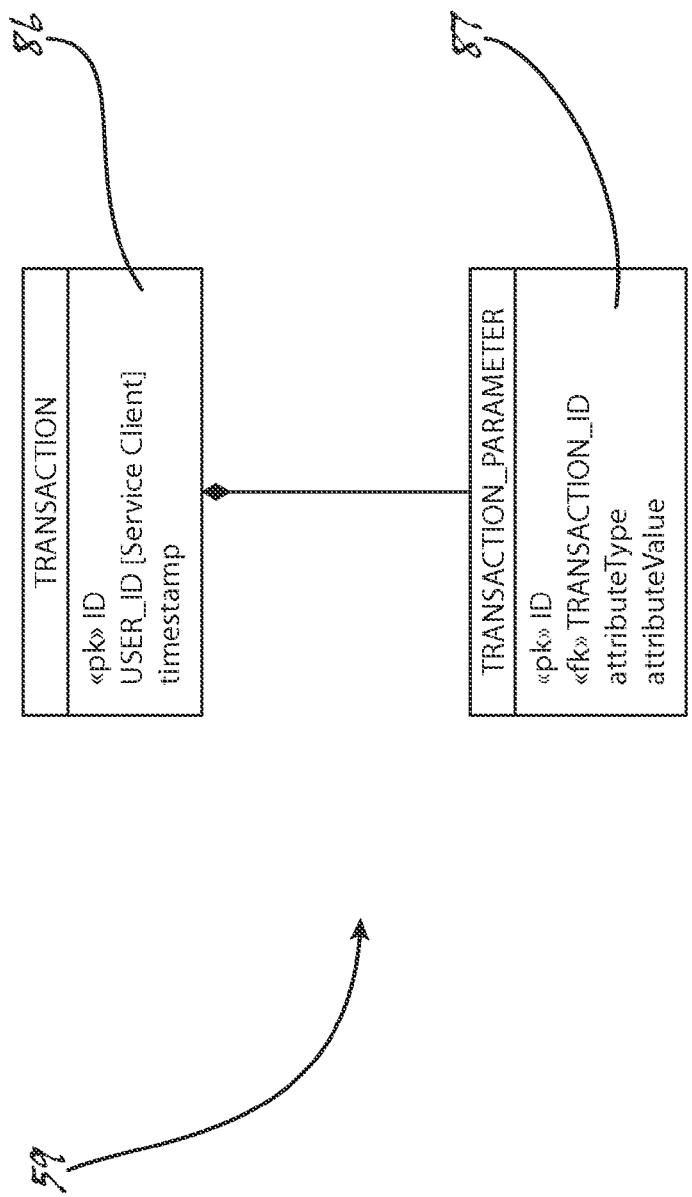
FIG. 8 shows, in a class diagram, a high level schema for a representative transaction database as may be implemented in connection with the exemplary hardware and software implementation of FIG. 5.

In order to efficiently manage and handle the large quantity of data that may typically be stored in connection with an implementation of the present invention, one or more dedicated database servers 98 hosting database management systems 57 are generally desired. As shown in FIG. 5, a typical database management system 57 may include a user database 58 for storing a wide variety of generally user centric data as may be required in the operation of the present invention and a transaction database 59 for storing data generally associated with the conduct of individual transactions. Although those of ordinary skill in the art will recognize that virtually unlimited alternatives are possible, FIG. 7 shows a very high level but generally representative schema for a user database 58 and FIG. 8 shows a very high level but also generally representative schema for a transaction database 59, each of which will be described in greater detail further herein in connection with an exemplary description of the conduct of a typical transaction.

Figure 6:
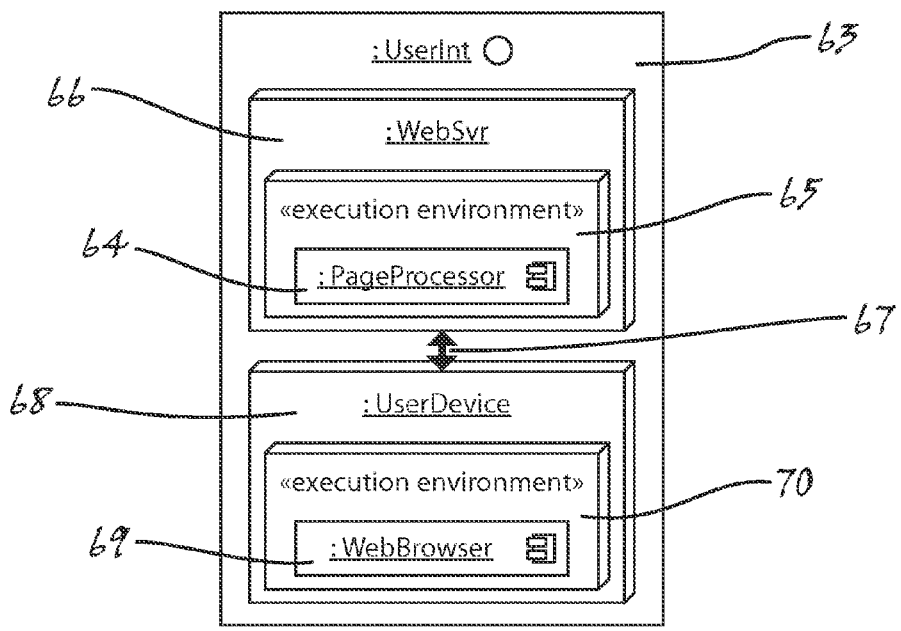
FIG. 6 shows, in a deployment diagram, various details of at least one particular implementation of a user interface for use in connection with the exemplary hardware and software implementation of FIG. 5.

Additionally, a preferably unified messaging gateway 60 is provided for use in receiving request messages 84 from and issuing confirmation messages 94 to end users 34 through various communication channels. As will be appreciated by those of ordinary skill in the art, such a unified messaging gateway 60 may be utilized to receive a request message 84 or transmit a generated confirmation message 94 in any of a plurality of message formats (such as, for example, as a short messaging service ("SMS") message, a standard text message, an e-mail message, a synthesized voice message, an alphanumeric page or the like) over any of a plurality of communication channels (such as, for example, an SMS or other text channel, a simple mail transport protocol ("SMTP") channel, a plain old telephone system ("POTS") channel, a paging network or private broadcast channel or the like) to be received by any of a plurality of user devices (such as, for example, a mobile or landline telephone, a smart phone, an e-mail client, a personal data assistant ("PDA"), a numeric or digital pager or the like). Still further, a service user interface 61 is provided and adapted to provide input from all manner of users 62, including administrative users, end users 34 and service client users 33, to the hardware and/or software systems of the service provider 36 and to provide output from these systems to the various users 62. Although the service user interface 61 may take a wide variety of forms depending upon the circumstances of any particular implementation, a typical user interface may be implemented as a web interface 63, as shown in FIG. 6, wherein there may be provided a page processor 64 hosted on an appropriate execution environment 65 installed on a dedicated web server 66 in Internet communication 67 with a user device 68, such as, for example, a personal computer, smart phone 78 or the like, and on which is installed and/or hosted a web browser 69 running in a provided execution environment 70. In any case, as will be appreciated by those of ordinary skill in the art, the provision of a service user interface 61, which of course should be secured, enables the various users 62 to maintain and/or otherwise manage the data stored in the user database 58 as may be appropriate as well as to generally manage and maintain the implemented authentication system 30. Finally, one or more resource communication gateways (not shown) may be provided in order to establish preferably secure communication between the systems of the service provider 36 and outside resource providers 43.

Continuing then with the example generally described with respect to FIG. 5, further details of the implementation are now described by way of the following detailed description of a possible use of the implementation for conducting a retail purchase transaction, which, for purposes of the example, shall be taken as completion of a purchase at an automobile fueling station, a restaurant or an on-line retailer (the service client 33) by a consumer (the end user 34) having available for payment a credit card and a checking account (secured resources). To complete the transaction, the consumer will indicate a desire to make a payment to the automobile fueling station, restaurant or on-line retailer by submitting to a service provider 36 a request for payment to the service client 33 and for authentication of the consumer's right of access to an identified secured payment resource, whereafter the end user 34 will provide a previously established authentication credential to the service client 33. The service client 33 will then forward the authentication credential to the service provider 36 for validation in order to obtain payment from the identified secured payment resource as requested by the consumer. In accordance with a critical aspect of the present invention, however, the automobile fueling station, restaurant or on-line retailer cannot be provided with or otherwise be made aware of either the consumer's credit card or checking account number and also must not be given any information that would allow the automobile fueling station, restaurant or on-line retailer to repeat the transaction without again obtaining authorization from the consumer.

Figure 9:
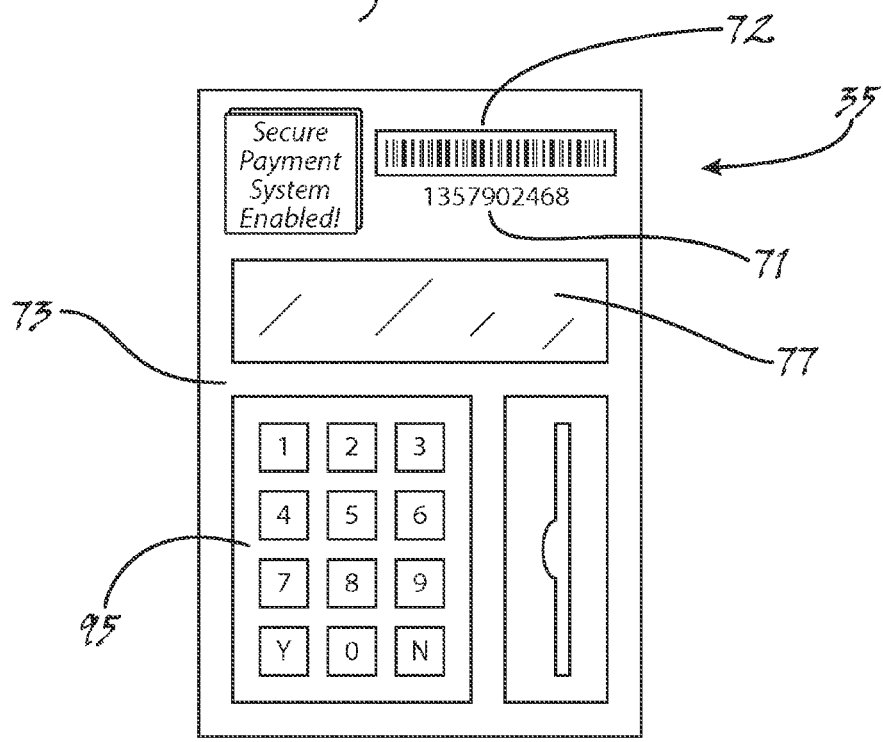
FIG. 9 shows, in an elevational representation, a representative terminal device such as may be provided in connection with a service client implementing functionality of the present invention and showing, in particular, representative means for identifying the service client as well as means for communicating an authentication credential to the service client as implemented in connection with a point-of-sale, fueling station, automatic teller machine or like terminal device.
Figure 10:
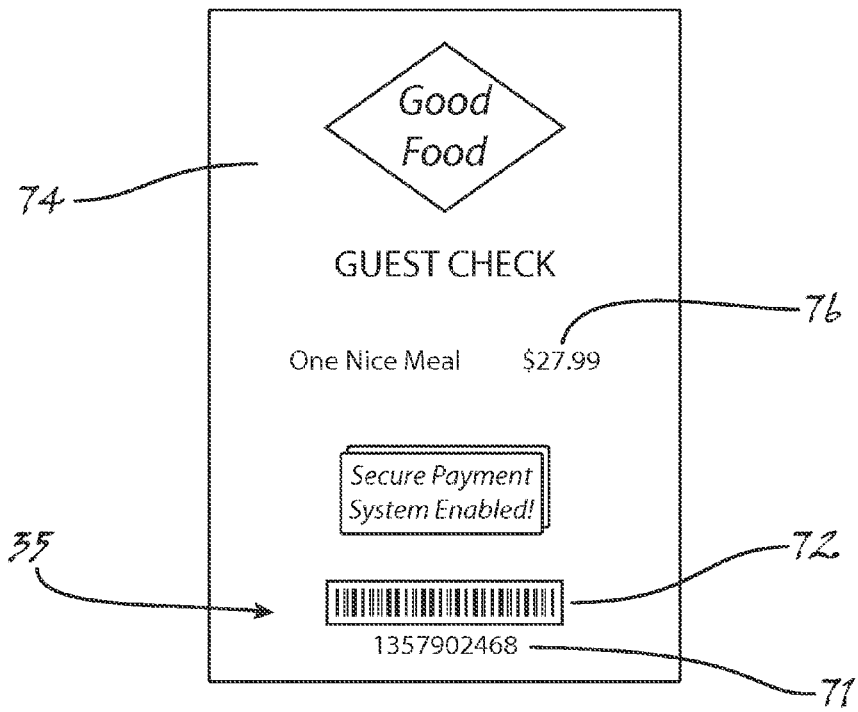
FIG. 10 shows, a top plan representation of a guest check, particularly showing representative means for identifying the service client as implemented in connection with a document.
Figure 11:
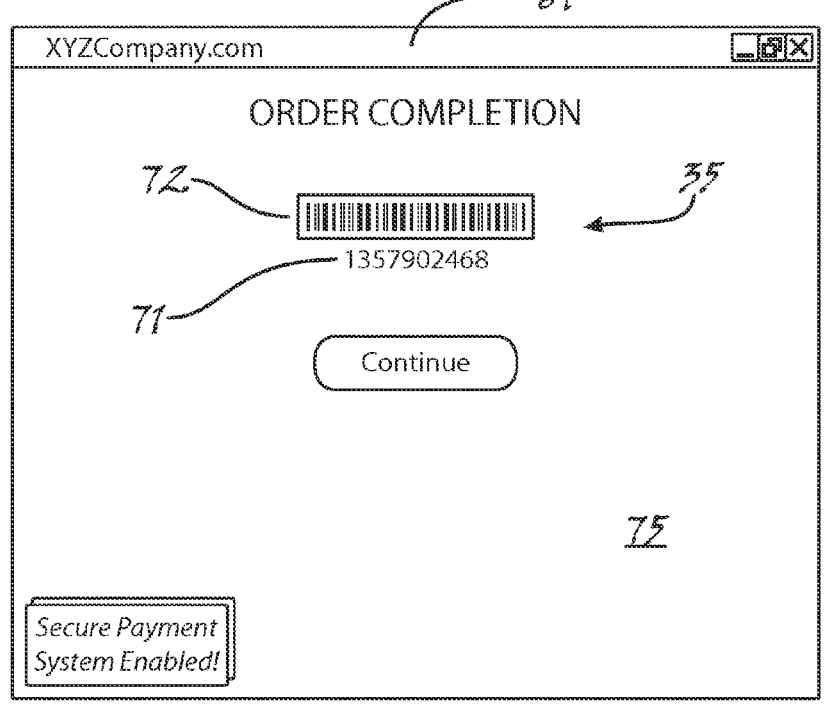
FIG. 11 shows, in a screen representation of a web browsing application, representative means for identifying the service client as implemented in connection with an on-line application.

As previously discussed, the authentication method 46 of the present invention generally begins with an end user 34 obtaining from a service client 33 data or other information necessary for the end user 34 to request that a service provider 36 provide for the service client 33 access to a secured resource. As also previously discussed, this data or other information will generally comprise the identification of the service client 33. Referring then to FIGS. 9 through 11 in particular, representative means 35 for identifying a service client 33 are shown to comprise an alphabetic and/or numeric identification code 71 and a machine readable identification code 72 such as, for example, a barcode or like representation. As particularly shown in FIG. 9, one or more such means 35 may be affixed by printing, placard or other labeling or electronically displayed on a screen, monitor or the like of a point-of-sale ("POS"), fueling station, automated teller machine ("ATM") or like terminal device 73. As particularly shown in FIG. 10, one or more such means 35 may be printed on a guest check 74, sales slip, invoice or the like prepared in anticipation of the completion of a financial transaction or on a similarly formatted request document such as, for example, a consent form for access to medical records, credit records or the like. As particularly shown in FIG. 11, one or more such means 35 may be displayed on a webpage 75, as part of a computer or like application program such as, for example, may be generated or otherwise provided in connection with an on-line financial transaction, activation or deactivation of an alarm system, access to of control of a computer or other machine, control of a door lock or a like application.

As also previously discussed, the data or other information obtained from a service client 33 may additionally comprise any other data or information as may be helpful for the conduct of a particular transaction such as, for example, a purchase amount 76, a client reference, detailed or itemized transaction data or the like. To this end it is noted that in most cases a means 35 for identifying a service client 33 may be dynamically generated on a transaction-by-transaction basis. For example, in the case of FIG. 9 representing a fueling station terminal device, the numeric identifier and/or barcode could be generated by the fueling station controller and displayed on the depicted screen, whereby the information collected by the end user 34 for use in submitting a request message 84 to the service provider 36 may include, for example, a transaction number or the like. Similarly, in the case of FIG. 9 representing an ATM terminal device, the numeric identifier 71 and/or barcode 72 could be generated by the ATM controller in at least partial reliance on user submitted information and, thereafter, displayed on the depicted screen 77, whereby the information collected by the end user 34 for use in submitting a request message 84 to the service provider 36 may include, for example, the amount of a withdrawal or other transaction, the types of accounts to use in completing the desired transaction or the like. In the case of FIG. 10 representing a document created for a particular transaction or in the case of FIG. 11 representing a computer or other dynamically created display, those of ordinary skill in the art will recognize that virtually any type of data or other information may be included for use by the end user 34 in submitting a request message 84 to the service provider 36.

Still further, however, the data or other information may for enhanced security include, in addition to the identification of the service client 33, a dynamically generated value that must be included as part of the identification of the service client 33 in order for a request message 84 submitted by an end user 34 to be accepted by a service provider 36. In implementation of such a feature, the end user 34 will generally provide some input to the service client 33 indicating that the end user 34 wants to make use of the service 30. At this point, the service client 33 will, preferably through a secured communication channel, request and obtain from the service provider 36 a uniquely formulated identification for use only in connection with the present transaction. The obtained unique identification is then used by the service client 33 and the end user 34 in the same manner as otherwise would be used a static identification. As will be appreciated by those of ordinary skill in the art, this feature is particularly useful in the detection and/or prevention of man-in-the-middle or other spoofing type deceptions.

Figure 12:
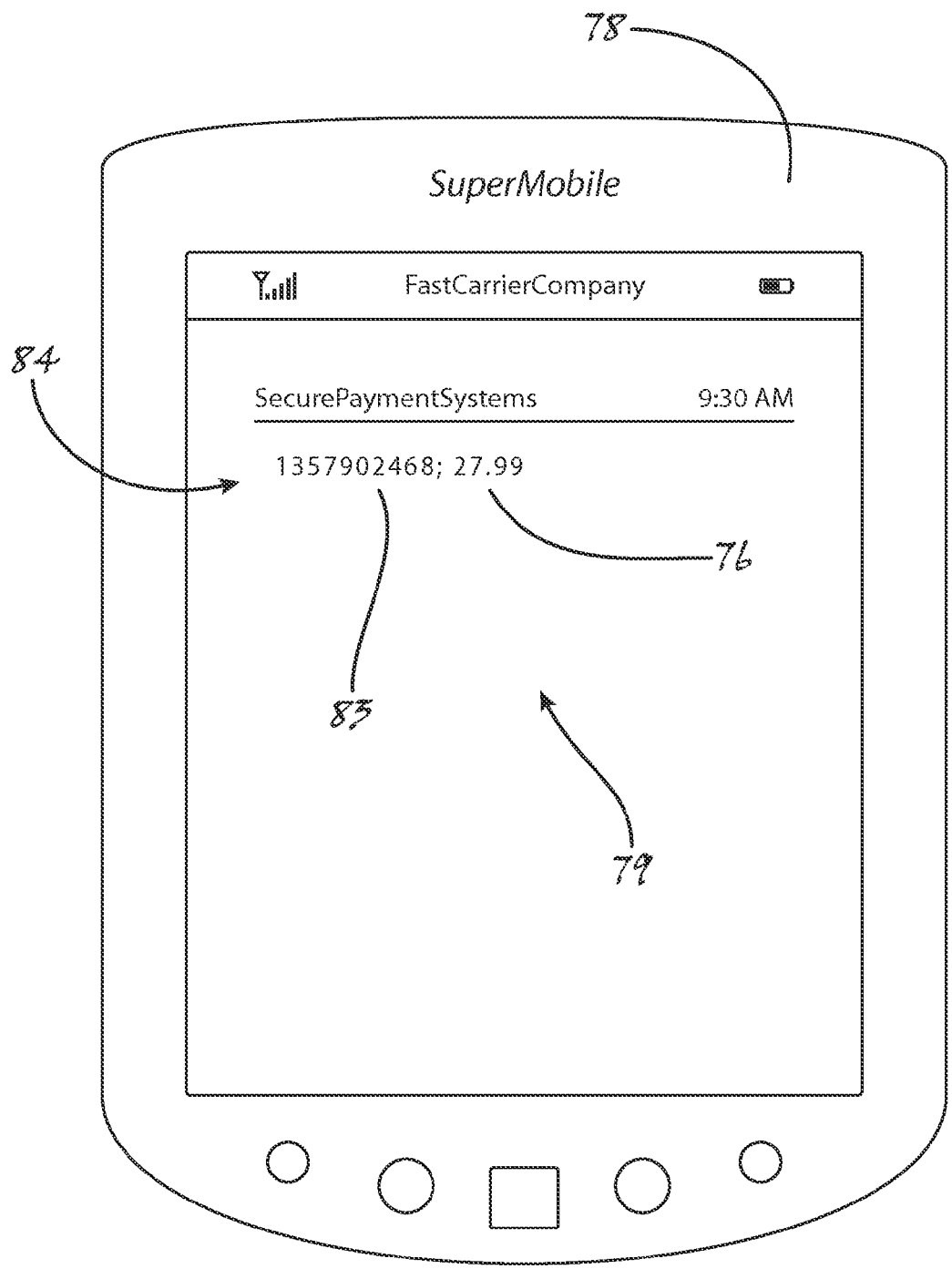
FIG. 12 shows, in a top plan representation of a mobile telecommunications device screen, an example of a request message such as may be utilized in accordance with the present invention.
Figure 14:
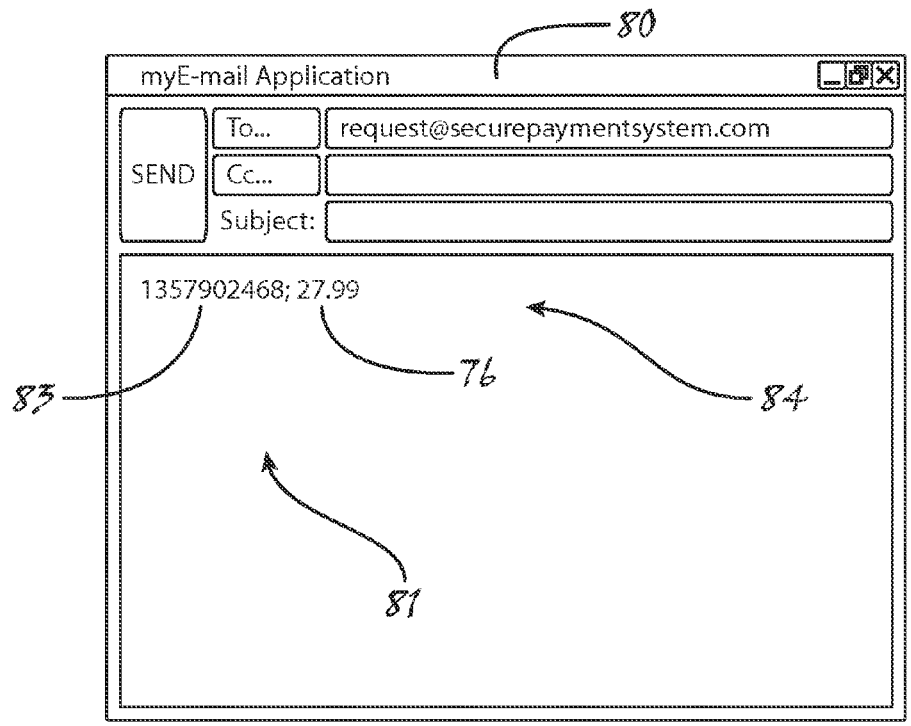
FIG. 14 shows, in a screen representation of an electronic mail application, a further example of a request message such as may be utilized in accordance with the present invention.
Figure 16:
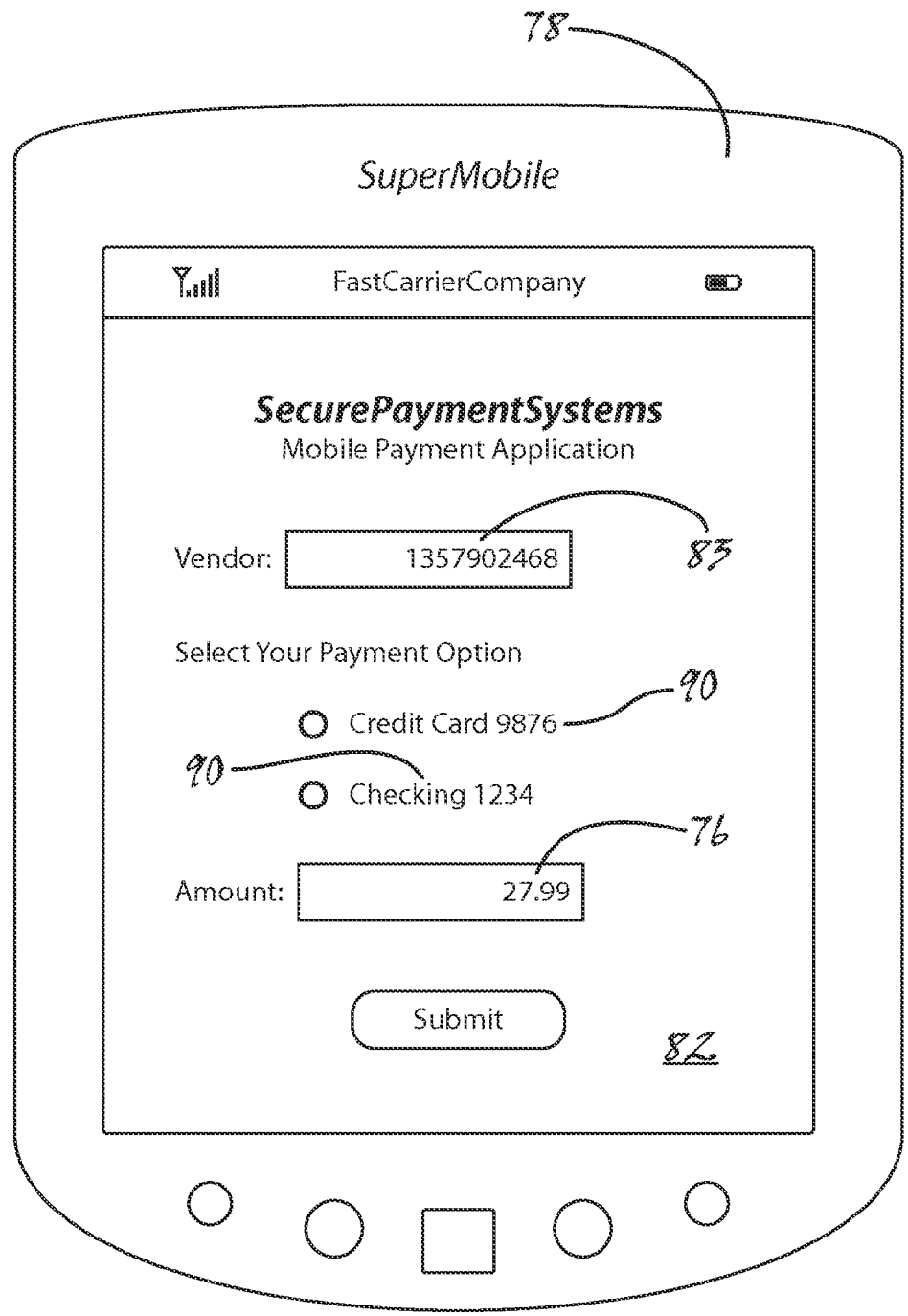
FIG. 16 shows, in a top plan representation of a mobile telecommunications device screen, a further exemplary implementation of an interactive generation of a request message in accordance with the present invention.

In any case, as also previously discussed, the service client provided information is then utilized by the end user 34 to submit a request message 84 to the service provider 36 for requesting that the service provider 36 provide for the service client 33 access to a secured resource. To this end, the end user 34 will require a means 38 for communicating the request message 84 to the service provider 36. As shown in FIG. 12, a mobile device 78, such as a cellular telephone, smart phone or the like, may be utilized to send an SMS or standard text message 79 over any available SMS or standard text capable communication channel to the messaging gateway 60 implemented for the service provider 36. Similarly, as shown in FIG. 14, an electronic mail client 80 may be utilized to send an electronic mail message 81 over any electronic mail capable communication channel to the messaging gateway 60 implemented for the service provider 36. Additionally, a web interface 63, which may be implemented as or in connection with the service user interface 61, may be utilized to enable the end user 34 to interactively communicate the request message 84 to the service provider 36. While implementation of the web interface 63 will generally dictate establishing at least some login functionality, which minimally would include requiring the provision of a user name or the like by which the service provider 36 can identify the particular end user 34 making a submission, those of ordinary skill in the art will recognize that such an implementation also has the advantage of providing the end user 34 with broad flexibility in tailoring of the request message 84 to any particular transaction. Still further, as shown in FIG. 16, a user application 82, which may be adapted for use on or in connection with a mobile device 78, a personal computer or any other appropriate hardware, may also be provided. As will be appreciated by those of ordinary skill in the art, implementation of such a user application 82 will not only provide generally the same advantageous flexibility as a web interface 63, but also may be provided with means for securely identifying the end user 34 to the service provider 36. For example, such a user application 82 may have embedded therein a token or other identifier, which may be encrypted if desired, for passage to the service provider 36 to identify the end user 34. In any case, it is also noted that because any desired formatting may generally be effected by a user application 82 such a user application 82 may also be adapted to communicate with the messaging gateway 60 or other user interface 61 implemented for the service provider 36 over virtually any communication channel including, for example and without limitation, an SMS or standard text capable communication channel, an SMTP capable communication channel, a POTS communication channel, a hypertext transfer protocol ("HTTP"), secure hypertext transfer protocol ("HTTPS"), file transfer protocol ("FTP") or other Internet or like network transfer protocol communication channel. Finally, it is noted that other devices and communication channels may also be utilized for submission by an end user 34 of a request message 84 to the service provider 36 as well as for communication by the service provider 36 to the end user 34 of a confirmation message 94. For example, and without limitation, the means 38 for communicating a request message 84 to a service provider 36 and/or means 39 for communicating a confirmation message 94 to an end user 34 may also comprise a telephone auto attendant, which may implement a DTMF decoder, speech recognition engine, TDD/TTY decoder or the like, or virtually any other combination of input modalities (including barcode readers or scanners, keyboards, keypads, pointing devices, microphones and the like) and output modalities (including visual displays such as computer or other device monitors or screens, audio output devices such as headphones or other speakers, tactile output devices such as may be adapted for the visually impaired and the like).

As particularly shown in FIGS. 12 and 14, a typical request message 84 may simply comprise information 83 identifying the service client 33 (such as, for example, a credit card program merchant identification number, a service provider issued or registered identification number or other identifier or the like) and, if necessary for the particular transaction, one or more additional parameters (such as, for example, a purchase amount 76 or the like). As exemplified by the depicted examples, the request message 84 may be formatted according to a predetermined pattern or other scheme, which, as will be appreciated by those of ordinary skill in the art, is particularly advantageous in implementations wherein the end user 34 may be required to submit the request message 84 by text message 79, inasmuch as such a formatted input will generally require a bare minimum of data entry by the end user 34. In any case, it is noted that in the examples of FIGS. 12 and 14 the request message 84 does not include identifying information for the end user 34. As will be appreciated by those of ordinary skill in the art, however, such information may be obtained by the service provider 36 by examining the telephone number from which the text message 79 was sent, in the case of FIG. 12, or by examining the "reply to" electronic mail address from which the electronic mail message 81 was sent, in the case of FIG. 14.

Figure 15:
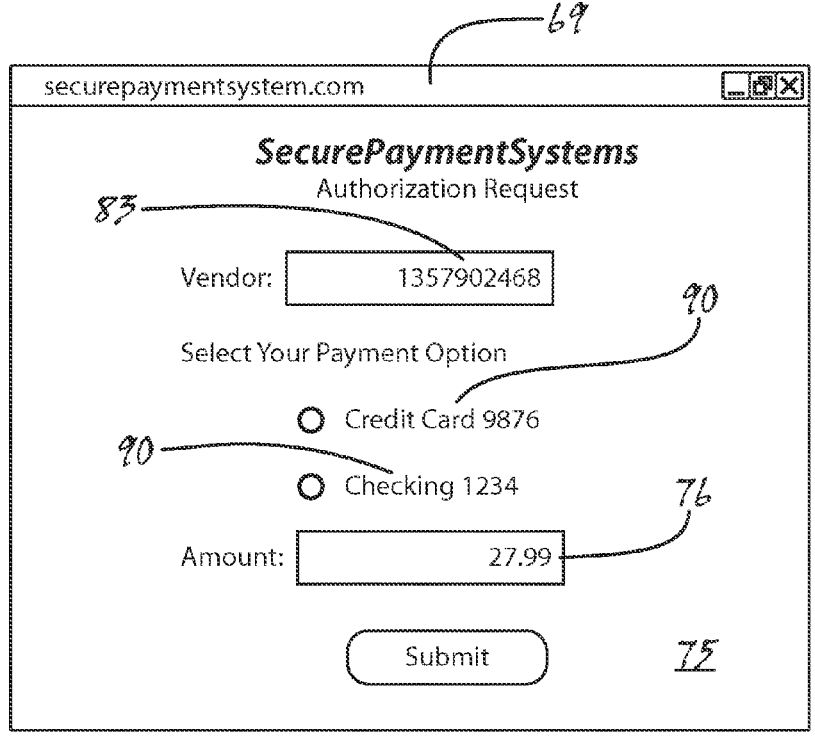
FIG. 15 shows, in a screen representation of a web browsing application, an exemplary implementation of an interactive generation of a request message in accordance with the present invention.

As particularly shown in FIGS. 15 and 16, the request message 84 may be formatted for transmission by the implemented website page processor 64 and/or user application 82, the details of which formatting will generally not need to be known by the end user 34. Additionally, it is noted that the information provided in either depicted implementation may be manually entered by the end user 34, automatically entered through a barcode reader (which, in the case of a mobile application 82 may be provided in connection with the camera application of a mobile device 78), or through a combination of manual and automatic entry. Additionally, these implementations are readily adapted to include any number of convenience features. For example, the screen as depicted in FIG. 16 may be produced as a result of scanning the barcode provided on the guest check 74 depicted in FIG. 10, but prior to submitting the request to the service provider 36 the end user 34 may change the amount 76 from "27.99" to "33.99," which may, under the circumstances of the transaction (including, for example, the knowledge that the service client 33 is a restaurant), be automatically interpreted by the service provider 36 as an indication that the end user 34 wishes to add a tip in the amount of $6.00 to the purchase price 76. In any case, once the request message 84 is assembled and/or formatted, if required, by the end user 34, the request message 84 is submitted to the service provider 36.

Once the request message 84 is received by the implemented messaging gateway 60 or, if appropriate, service user interface 61, the nature of the request will be identified and the request message 84 will then be routed to the request handler 51 hosted on the service provider's application server 50. Upon receipt of the consumer's request message 84, the request handler 51 will generally first undertake to determine whether the purported end user 34 is recognized at the service provider 36. To this end, the request handler 51 may access the user database 58, as generally shown in FIG. 7, to determine whether the provided or inferred end user 34 identification can be located in the user table 85. If not, the authentication process 46 will generally terminate. If, on the other hand, the provided or inferred end user 34 identification is recognized the request handler 51 will proceed to establish a new transaction record in the transaction table 86 of the transaction database 59, as generally shown in FIG. 8, and at this time should also store in the transaction record the unique USER_ID by which the automobile fueling station, restaurant or on-line retailer is known in the user database 58. Additionally, any other pertinent provided information such as, for example, the client reference, purchase amount 76 or the like, may be stored in the transaction parameter records 87, which will be created as required.

With the new transaction record established and known pertinent information appropriately stored, the request handler 51 then undertakes to identify a particular secured resource for fulfillment of the consumer's request. As previously noted in the setup to the present example, however, the consumer wishing to make payment to the automobile fueling station, restaurant or on-line retailer has more than one secured payment resource available for use, which information will become known to the request handler 51 upon searching the resource table 88 of the user database 58 for secured resources associated with the USER_ID by which the tentatively identified consumer is known.

As shown in the exemplary user database 58 of FIG. 7, the resource table 88 is preferably provided with the ability to store at least an indication of the class and subclass of each resource, which in the example given may identify the consumer's credit card account and checking account as both being of the class "payment" and, further, may identify the credit card account as being of the subclass "program X" and the checking account as being of the subclass "checking." While the indication that the consumer has requested a payment is sufficient to identify these two candidate resources, it is insufficient without more to determine which of the two should be utilized to continue the transaction. To this end, the authentication system of the present invention is preferably provided with means for determining a particular resource for access on the authority of the end user 34.

In a first example of such a means a priority may be assigned by each user 34 of a resource to the particular resource, whereby resources of a particular class or, if the service client 33 accepts only a certain subclass, on the basis of a particular class and subclass the available resources meeting the selection criteria may be sorted to determine the appropriate resource for use. Such priority values may, for example, be stored in the resource user table 99 of the user database 58 as depicted in FIG. 7.

Figure 13:
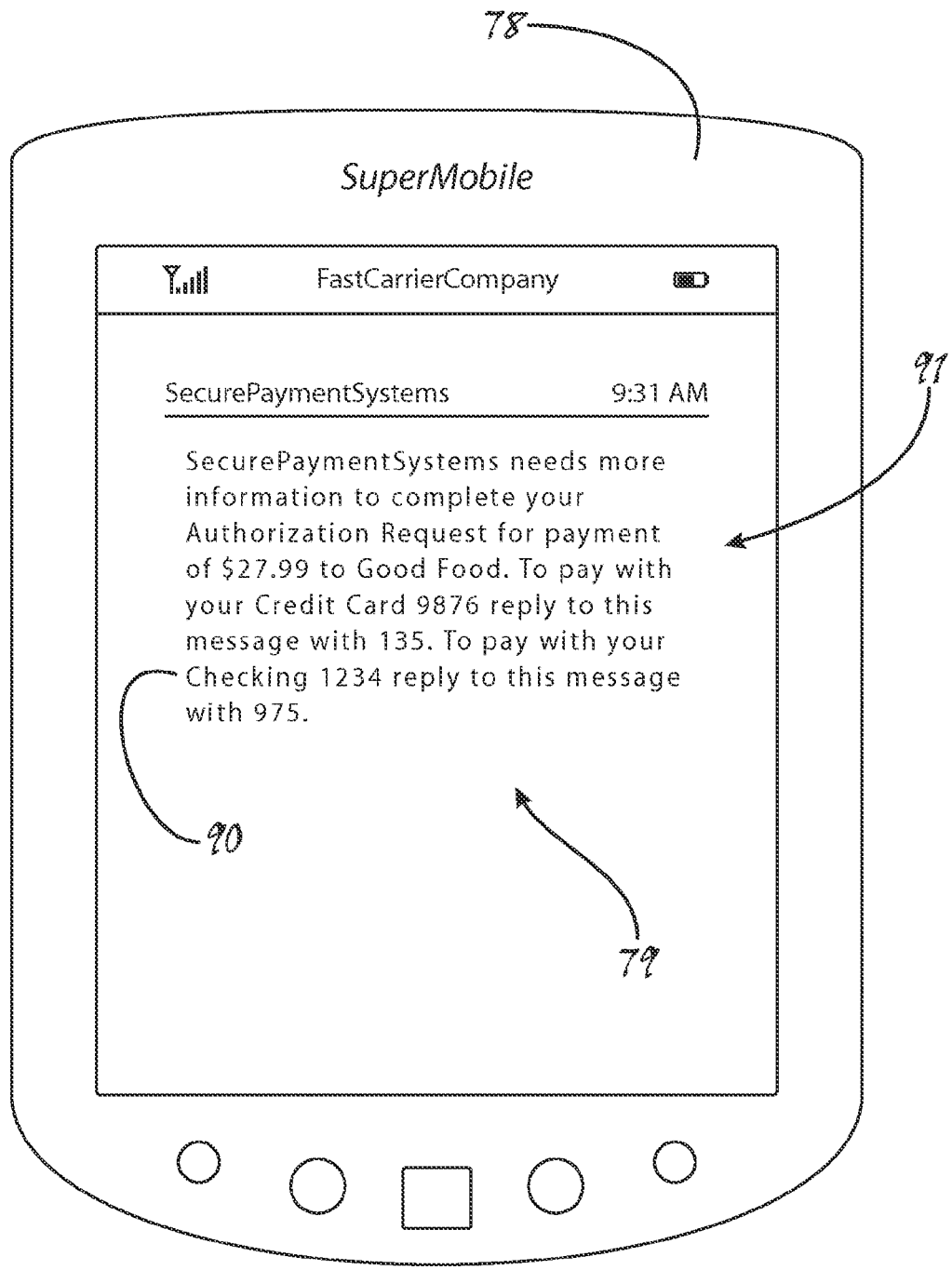
FIG. 13 shows, in a top plan representation of a mobile telecommunications device screen, an example of an inquiry message such as may be implemented in accordance with the present invention.

In a second example of such a means each resource may be assigned a pseudonym 90 comprising generally non-identifying information but nonetheless information which is unique among the class of resource for any particular user, which pseudonyms may be stored in the resource attribute table 89 of the user database 58. Making use of the stored pseudonym 90, this means for determining a particular resource for access by the end user 34 comprises generating an inquiry message 91 for transmission to the end user 34 whereby the service provider 36 requests that the end user 34 select one resource based on the assigned pseudonym. As particularly shown in FIG. 13, such an inquiry message 91 may be sent by generally any means available for communication with the end user 34, including any means appropriate for submitting request messages 84 or issuing challenge messages 94, and is preferably formatted for simple reply.

In the example implementation (assuming that no priority information was stored), upon determining that the tentatively identified end user 34 has more than one secured payment resource, but that each available resource has associated therewith a pseudonym 90, the service provider 36 would generate an inquiry message 91 for transmission to the end user 34, which inquiry message 91 may request that the consumer enter a simple response indicating whether he or she wishes to proceed using his or her "Credit Card 9876" or using his or her "Checking 1234." Once generated, the request handler 51 will generally queue the inquiry message 91 at the service provider's messaging gateway device 60 for transmission to the consumer. The consumer may then select the desired payment option and respond, causing an updated request message 84 to be routed to the request handler 51. At this point the request handler 51 will again undertake to identify a particular secured resource for fulfillment of the consumer's request.

In any case, once an appropriate particular secured resource is identified for access, any remaining transaction parameters, including the unique RESOURCE_ID by which the identified resource is known in the user database 58, is preferably stored in the transaction database 59 as shown in FIG. 8. With the end user 34 and the resource for which the end user 34 requests access both identified and logged to the transaction database 59, the authenticator 52 hosted on the service provider's application server 50 takes control from the request handler 51 and undertakes to determine the appropriate key string for use in positively authenticating the identity of the presently tentatively identified end user 34. To this end, the authenticator 52 will generally first look to the resource attribute table 89 of the user database 58 to determine if there exists a previously established key string specifically designated for use with the identified secured resource. If so, the located key string will generally be saved by the authenticator 52 in the transaction table 87 of the transaction database 59 for later retrieval and use as the key string with which to validate a submitted authentication credential. If, on the other hand, no key string is identified as being specifically designated for use with the identified secured resource, the authenticator 52 will use for the key string a private string, which in the preferred implementation of the present invention is an end user selected or service provider assigned key string that is for each end user 34 stored in the user table 85 of the user database 58 for use as a "default" key string for the end user 34. While in the most preferred implementations of the present invention it is desirable that the default private string be unique for each end user 34, it is generally sufficient that the private string comprises a string that is not readily predicable. In any case, a timestamp may at this time also be entered into the transaction table 86 in order to provide a reference by which may be calculated a timeout event for the validity of the key string.

It is now noted that as used herein a "string" shall for purposes of the present invention be expressly defined to mean "an ordered sequence of any subset of symbols selected from a set of symbols wherein each symbol forming the set may be represented in both a format that may be perceived by an end user 34 and a format that may be recognized by software or hardware," e.g. the set of all alphabetic and numeric characters in the English language. Although not strictly necessary for the conduct of the present invention, it will be desirable, in at least those implementations requiring human handling of an authentication credential, that the authentication credential comprise symbols that also may be perceived by a human end user 34.

Figure 17:
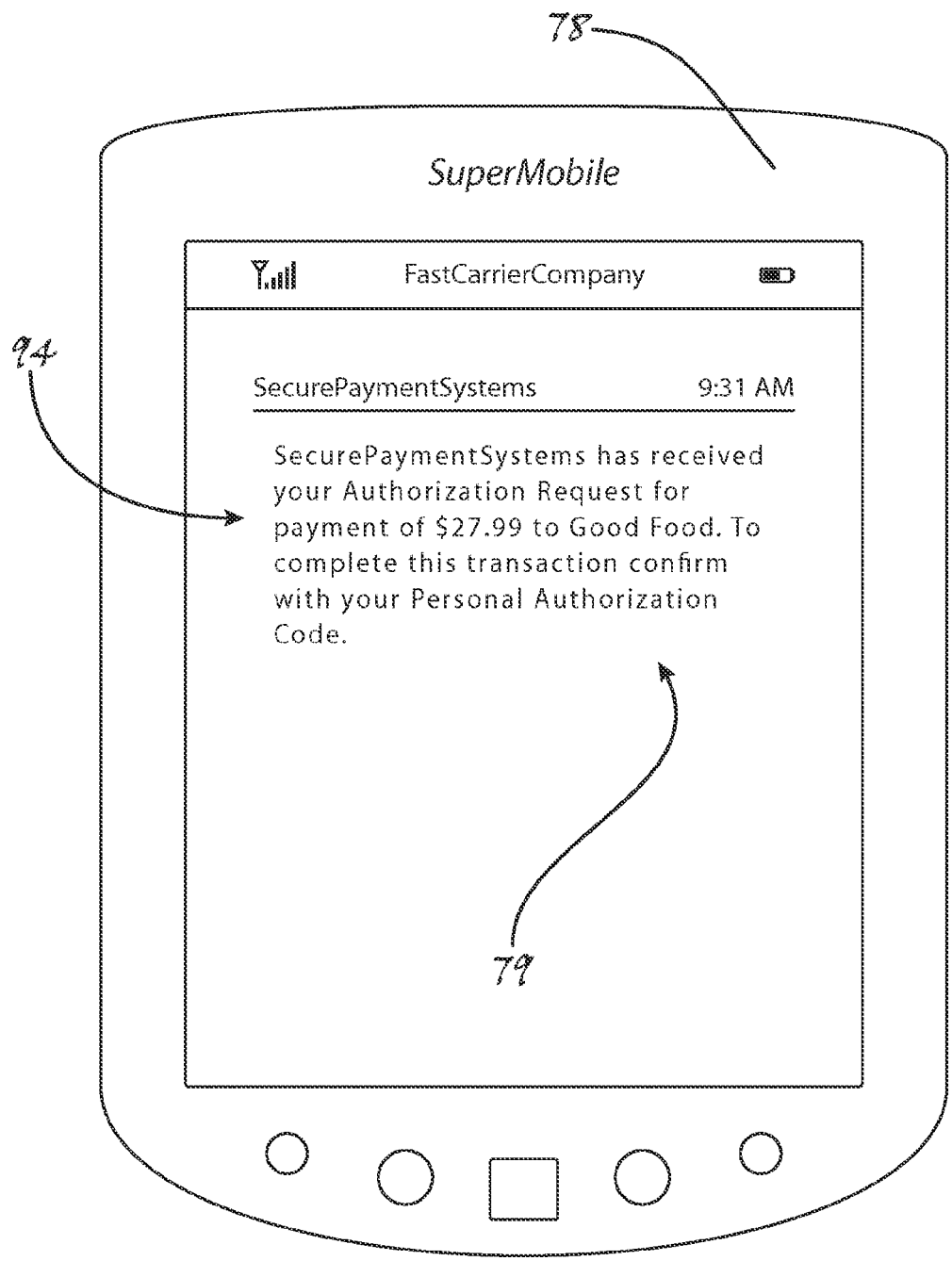
FIG. 17 shows, in a top plan representation of a mobile telecommunications device screen, an example of a confirmation message such as may be implemented in accordance with the present invention.

With the appropriate key string identified and saved to the transaction database 59, the confirmation message 94 is, if required in a particular implementation of the present invention, sent to the end user 34. Referring then to FIG. 17 in particular, there is shown a typical simple confirmation message 94 as may be transmitted to an end user 34 through a text enable smart phone or like mobile device 78. Following with the presented example, it is noted that in an optional but useful feature of the present invention the confirmation message 94 may also include information helpful to the consumer in continuing the transaction in progress. For example, the confirmation message 94 depicted in FIG. 17 includes the name of the restaurant for which the consumer made the access request and the purchase amount 76 for which the consumer requests access to his or her secured resource.

Turning the example now to detailed discussion of the steps 48 implicated in validating the purported access right of the user requesting access to the secured resource, the validation steps 48 begin with the consumer providing to the service client 33 for which access to a secured resource has been requested, as an authentication credential, the key string as previously established between the end user 34 and the service provider 36 for use in connection with either the specific resource for which is access is requested or, if no such specific key string has been previously established, the private string for the end user 34. While the authentication credential (key string) may generally be provided to a service client 33 in any conceivable manner, including verbally, in writing, by electronic transmission or the like, at least some implementations may require that the end user 34 provide the key string in a particular manner. For example, a self-service type transaction at a POS, ATM or fueling station terminal device 73 will generally dictate that the end user 34 provide the authentication credential through the service client provided input modality 95. In any case, with the authentication credential provided, the fueling station, restaurant or on-line retailer submits in an authentication message the end user provided authentication credential to the service provider 36 along with the service client's identifying information 71 for validation and, assuming validation passes, access to the end user's authorized secured resource—in this case payment.

Once the authentication credential is received by the service provider 36, it is routed by the messaging gateway 60 or service user interface 61 to the authenticator 52 hosted on the service provider's application server 50. The authenticator 52 will then direct the validation tool 55 to evaluate the submitted authentication credential based upon the client identity and/or client reference for the authentication message. The validation tool 55 will access the transaction database 59 to retrieve the key string associated with the particular service client identity and/or service client reference and will evaluate the submitted credential against the retrieved key string (taking into account, if appropriate for the particular implementation, the passage of time) and will then report the result of the evaluation to the authenticator 52. As will be appreciated by those of ordinary skill in the art in light of this exemplary detailed description, only a submitted authentication credential matching a key string particularly pre-authorized by the end user 34 for use by the particular service client 33 making the submission in connection with transaction in process will pass evaluation. In any case, if the evaluation fails the process 48 will terminate and the failure will be reported by the request handler 51 to the service client 33. If, on the other hand, the evaluation passes the request handler 51 will determine whether a resource need be accessed on behalf of the fueling station, restaurant or on-line retailer.

If the request handler 51 determines that a resource should be accessed, a resource request is formulated using the transaction parameters stored in the transaction database 59 and any additional information as may be necessary that is stored in the user database 58. For example, in the case of processing a credit card transaction, the request handler 51 will retrieve the transaction amount from the transaction database 59 and will retrieve the full credit card number, expiration date, billing address, CV number or other necessary information pertaining to the credit card account from the resource attribute table 89 of the user database 58 and may also retrieve from the user attribute table 92 of the user database 58 necessary information concerning the fueling station, restaurant or on-line retailer such as, for example, banking information for deposit of obtained funds. In any case, the complete resource request is by the request handler 51 queued to a resource communication gateway and processed whereafter the result of the transaction is reported to the fueling station, restaurant or on-line retailer and also, preferably, to the consumer.

In a particularly efficient feature of the present invention, the service provider 36 may provide for the consumer an electronically generated receipt for the conducted transaction, which may be transmitted by e-mail or otherwise. In a case where the fueling station, restaurant, on-line retailer or other service client 33 provides itemized or otherwise detailed purchase data, such data may be included as part of the receipt. This, of course, completely relieves the service client 33 of having to generate a receipt. Additionally, combined transaction data may be assembled by the service provider 36 for periodic bulk reporting to the service client 33. Still further, the service provider 36 may, if desired, implement a budgeting service for the end user 34, wherein at the end user's behest financial transactions over budgeted limits or over budgeted limits for particular service clients 33 or types of service clients 33 will be deemed to fail validation in order to force compliance with the terms of a budget.

While the foregoing description is exemplary of the preferred embodiment of the present invention, those of ordinary skill in the relevant arts will recognize the many variations, alterations, modifications, substitutions and the like as are readily possible, especially in light of this description, the accompanying drawings and claims drawn thereto. For example, those of ordinary skill in the art will recognize that a special program logo, such as the exemplary "Secure Payment System Enabled!" logo depicted in various of the figures may be utilized to signal to a potential end user 34 that system, facility or the like for which the end user 34 desires access has implemented the teachings of the present invention. In any case, because the scope of the present invention is much broader than any particular embodiment, the foregoing detailed description should not be construed as a limitation of the scope of the present invention, which is limited only by the claims appended hereto.

What is claimed is:

1. An authentication system for authenticating the identity of a requester of access by an unauthorized service client to a secured resource, said authentication system comprising:
   a messaging gateway having a first set of instructions embodied in a computer readable medium, said first set of instructions operable to receive from a requester purporting to be an authorized user of a secured resource a request for access by an unauthorized service client to said secured resource;
   a server in secure communication with said messaging gateway, said server having a second set of instructions embodied in a computer readable medium operable to determine a key string known to both said secured resource and the authorized user said requestor purports to be, said key string being adapted to provide a basis for authenticating the identity of said requester;
   a service user interface in communication with said server, said service user interface having a third set of instructions embodied in a computer readable medium operable to receive input from said unauthorized service client;
   wherein said second set of instructions is further operable to receive an authentication credential from said unauthorized service client associated with said request for access, said authentication credential having been provided to said unauthorized service client by said requestor; and
   wherein said second set of instructions is further operable to evaluate said authentication credential to authenticate the identity of said requester.

2. The authentication system as recited in claim 1 wherein:
   said second set of instructions is further operable to generate a confirmation message indicating receipt of said request for access; and
   said first set of instructions is further operable to communicate said confirmation message to said authorized user that said requester purports to be.

3. The authentication system as recited in claim 1 wherein said second set of instructions is further operable to for determine from among a plurality of secured resources associated with said authorized user the identity of a single secured resource to which said requester requests access.

4. The authentication system as recited in claim 3, wherein said second set of instructions is further operable to determine a priority value for each of said plurality of said secured resources.

5. The authentication system as recited in claim 3, wherein said second set of instructions includes instructions to:
   for generate an inquiry message;
   transmit said inquiry message to said authorized user; and
   receive a response to said inquiry message and determine based upon said response to said inquiry message the identity of a single secured resource to which said requester requests access.

6. The authentication system as recited in claim 1, wherein said second set of instructions includes instructions operable to invalidate said authentication credential based upon passage of time.

7. The authentication system as recited in claim 1, said second set of instructions operable to conduct for the benefit of said unauthorized service client a transaction reliant upon access to said secured resource.

8. The authentication system as recited in claim 7, said second set of instructions further operable to:
   generate a receipt for said transaction; and
   transmit said receipt to said authorized user.

9. The authentication system as recited in claim 7, wherein said transaction comprises providing a financial benefit.

10. The authentication system as recited in claim 1, wherein said request for access comprises a transient identifier for said unauthorized service client, said transient identifier being dynamically generated by said authentication system.

11. A method for authenticating the identity of a requester of access to a secured resource, said method for authenticating comprising the steps of:
    receiving at a messaging gateway having a first set of instructions embodied in a computer readable medium, said first set of instructions operable to receive from a requester purporting to be an authorized user of a secured resource, a request for access by an unauthorized service client to a secured resource from a requester purporting to be an authorized user of said secured resource;
    determining a key string with a server in secure communication with said messaging gateway, said server having a second set of instructions embodied in a computer readable medium operable to determine a key string known to both said secured resource and the authorized user said requestor purports to be, said key string being adapted to provide a basis for authenticating the identity of said requester;
    a service user interface in communication with said server, said service user interface having a third set of instructions embodied in a computer readable medium operable to receive input from said unauthorized service client;
    wherein said second set of instructions is further operable to receive from said unauthorized service client an authentication credential associated with said request for access, said authentication credential having been provided to said unauthorized service client by said requestor; and
    wherein said second set of instructions is further operable for evaluating said authentication credential to authenticate the identity of said requester.

12. The method for authenticating the identity of a requester of access to a secured resource as recited in claim 11, said method for authenticating further comprising the steps of:
  generating a confirmation message indicating receipt of said request for access; and
  communicating said confirmation message to said authorized user that said requester purports to be.

13. The method for authenticating the identity of a requester of access to a secured resource as recited in claim 11, said method for authenticating further comprising the step of determining from among a plurality of secured resources associated with said authorized user the identity of a single secured resource to which said requester requests access.

14. The method for authenticating the identity of a requester of access to a secured resource as recited in claim 13, wherein said step of determining said single secured resource comprises sorting said plurality of secured resources by priority values.

15. The method for authenticating the identity of a requester of access to a secured resource as recited in claim 13, wherein said step of determining said single secured resource comprises:
  generating an inquiry message, said inquiry message referring to each of said plurality of secured resources by a pseudonym;
  transmitting said inquiry message to said authorized user;
  receiving a response to said inquiry message from said authorized user; and
  determining based upon said response to said inquiry message the identity of a single secured resource to which said requester requests access.

16. The method for authenticating the identity of a requester of access to a secured resource as recited in claim 11, said method for authenticating further comprising the step of determining based upon passage of time whether said authentication credential should be deemed invalid.

17. The method for authenticating the identity of a requester of access to a secured resource as recited in claim 11, said method for authenticating further comprising the step of conducting for the benefit of said unauthorized service client a transaction reliant upon access to said secured resource.

18. The method for authenticating the identity of a requester of access to a secured resource as recited in claim 17, said method for authenticating further comprising the steps of:
  generating a receipt for said transaction; and
  transmitting said receipt to said authorized user.

19. The method for authenticating the identity of a requester of access to a secured resource as recited in claim 17, wherein said transaction comprises providing a financial benefit.

20. The method for authenticating the identity of a requester of access to a secured resource as recited in claim 11, said method for authenticating further comprising the steps of:
  generating a dynamic identifier for said unauthorized service client;
  transmitting to said unauthorized service client said dynamically generated identifier; and
  receiving said dynamically generated identifier from said requester as at least part of said request for access.

* * * * *